ically effective antibiotics, especially 7-(D-α-phenylglycylamido)-3-methoxy-3-cephem-4-
United States Patent [19]
Chauvette

[11] 3,917,588
[45] Nov. 4, 1975

[54] α-AMINOACYL CEPHALOSPORIN ETHERS
[75] Inventor: Robert R. Chauvette, Indianapolis, Ind.
[73] Assignee: Eli Lilly and Company, Indianapolis, Ind.
[22] Filed: Nov. 28, 1972
[21] Appl. No.: 310,190

[52] U.S. Cl. .............................. 260/243 C; 424/246
[51] Int. Cl.² ................ C07D 501/18; C07D 501/20
[58] Field of Search ................................ 260/243 C

[56] References Cited
UNITED STATES PATENTS
3,665,003  5/1972  Kennedy et al. ................ 260/243 C
3,668,203  6/1972  Clark et al. ..................... 260/243 C Primary Examiner—Nicholas S. Rizzo
Attorney, Agent, or Firm—William B. Scanlon; Everet F. Smith

[57] ABSTRACT

α-Aminoacyl cephalosporins represented by the formula

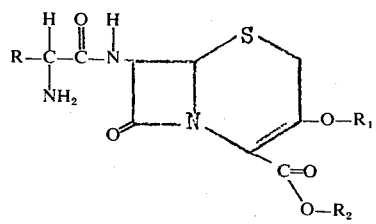

wherein R is phenyl, substituted phenyl, thienyl or furyl, $R_1$ is hydrogen, methyl, ethyl or 3-methyl-2-butenyl; and $R_2$ is hydrogen or an ester forming group; are provided. When $R_1$ is other than hydrogen and $R_2$ is hydrogen the 3-cephem ethers provided are valuable orally effective antibiotics, especially 7-(D-α-phenylglycylamido)-3-methoxy-3-cephem-4-carboxylic acid. The 3-hydroxy cephalosporins ($R_1$ = H, $R_2$ = ester) are valuable intermediates.

10 Claims, No Drawings

α-AMINOACYL CEPHALOSPORIN ETHERS

BACKGROUND OF THE INVENTION

This invention relates to the cephalosporin class of antibiotics. In particular it relates to a novel group of orally effective cephalosporin antibiotics.

Among the presently used cephalosporin antibiotics, cephalexin [7-(D-α-phenylglycylamido)-3-methyl-3-cephem-4-carboxylic acid] is a particularly valuable antiobiotic because of its oral effectiveness.

In the search for more effective and orally active antibiotics a wide variety of cephalosporin antibiotics of varying structures have been synthesized. Notably, extensive investigation of the deacetoxycephalosporanic acids (3-methyl-3-cephems) of which cephalexin is a member have been investigated.

Recently, 7-acylamido-3-methoxymethyl-3-cephem-4-carboxylic acid antibiotics were described in U.S. Pat. No. 3,665,003. The described compounds have the structural feature of an alkoxy substituted methyl group in the 3-position of the dihydrothiazine ring of the cephalosporin.

The cephalosporin antibiotics provided by the present invention represent a novel class of cephalosporin ethers having the oxygen atom of an ether substituent attached directly to the $C_3$ carbon of the dihydrothiazine ring.

DETAILED DESCRIPTION

The cephalosporin compounds of this invention are represented by the following Formula I,

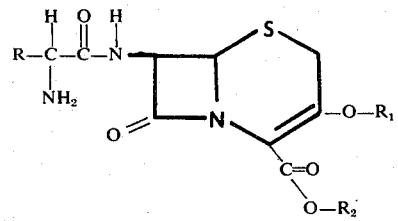

wherein
R is phenyl, hydroxyphenyl, halophenyl, methylphenyl, methoxyphenyl, 2-thienyl, 3-thienyl or 2-furyl;
$R_1$ is hydrogen, methyl, ethyl or 3-methyl-2-butenyl;
$R_2$ is hydrogen or a carboxylic acid protecting ester forming group; and when $R_2$ is hydrogen the pharmaceutically acceptable nontoxic salts thereof; with the limitation that when $R_1$ is hydrogen, $R_2$ is a carboxylic acid protecting ester forming group.

In the foregoing description of the compounds of the invention, the term "hydroxyphenyl," refers to 4-hydroxyphenyl, 3-hydroxyphenyl, and 2-hydroxyphenyl. "Halophenyl," refers to the isomeric fluoro, chloro and bromo phenyl groups such as 4-fluorophenyl, 4-chlorophenyl, 3-chlorophenyl, 2-chlorophenyl, 3-bromophenyl, 4-bromophenyl and the like. "Methylphenyl," refers to the isomeric 2-, 3-, and 4-methylphenyl groups and the term "methoxyphenyl" refers to 4-methoxyphenyl, 3-methoxyphenyl and 2-methoxyphenyl.

As used herein, the term "a carboxylic acid protecting ester forming group," has reference to the ester groups commonly employed for the protection of the $C_4$ carboxyl group of the cephalosporins and which are characterized by their ease of removal under basic or acidic hydrolysis conditions or by catalytic hydrogenolysis to regenerate the free carboxylic acid function. Illustrative of such carboxylic acid protecting groups are the 2,2,2-trichloroethyl, diphenylmethyl (benzhydryl), p-nitrobenzyl, p-methoxybenzyl, t-butyl, trimethylsilyl and like groups. The methods used for the preparation and subsequent removal of the cephalosporin esters described herein are all known methods which have been previously described.

The compounds represented by the Formula I wherein $R_1$ is methyl, ethyl or 3-methyl-2-butenyl and $R_2$ is hydrogen are valuable antibiotics which are effective when administered by the oral route.

The antibiotic compounds of the invention are prepared by a variety of synthetic methods. According to one method of preparation a 7-amino-3-exomethylenecepham-4-carboxylic acid ester and preferably a salt thereof such as the hydrochloride salt is reacted with ozone to produce an intermediate ozonide. The ozonide is decomposed to yield a 7-amino-3-hydroxy-3-cephem-4-carboxylic acid ester salt. The 3-hydroxy-3-cephem-ester is then alkylated and preferably with a diazo compound for example diazomethane to yield the corresponding 3-ether derivative, for example the 3-methoxy or 3-ethoxy derivative. The 7-amino-3-ether cephem ester is then acylated by known methods with a derivative of a substituted glycine represented by the formula

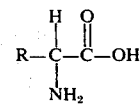

wherein R is as defined for Formula I. The carboxylic acid protecting ester group, $R_2$, is removed to provide the antibiotic compound of the invention.

The starting materials employed in the above described preparation, 7-amino-3-exomethylenecepham-4-carboxylic acid esters, are prepared as described in my co-pending application, Ser. No. 118,941 filed, Feb. 25, 1971. For example, a 7-acylamidocephalosporanic acid such as 7-phenoxyacetamidocephalosporanic acid is reacted with a sulfur containing nucleophile according to known procedures to effect the nucleophilic displacement of the acetoxy group of the cephalosporanic acid and provide a 7-acylamido-3-thio-substituted methyl-3-cephem-4-carboxylic acid. The 3-thio-substituted cephem acid is then reduced with zinc/formic acid in the presence of dimethylformamide or with Raney nickel in the presence of hydrogen to yield a 7-acylamido-3-exomethylene-cepham-4-carboxylic acid. For example, 7-phenoxyacetamido-3-acetoxymethyl-3-cephem-4-carboxylic acid is reacted with potassium ethyl xanthate to afford 7-phenoxyacetamido-3-ethoxythionocarbonylthiomethyl-3-cephem-4-carboxylic acid. Reduction of the latter compound with zinc and formic acid in the presence of DMF provides 7-phenoxyacetamido-3-exomethylenecepham-4-carboxylic acid. The acid is esterified, for example with p-nitrobenzyl bromide and the p-nitrobenzyl ester is reacted with phosphorus pentachloride in the presence of pyridine to effect the cleavage of the phenoxyacetyl group and provide the 7-amino-3-exomethylenecepham-4-carboxylic acid ester.

According to the present invention, a 7-amino-3-exomethylenecepham-4-carboxylic acid ester is reacted with ozone in an inert solvent at a temperature between about −80° and 0°C. and preferably between −80° and −50°C. to form an intermediate ozonide. The ozonide is decomposed, in situ, in the cold to provide a 7-amino-3-hydroxy-3-cephem-4-carboxylic acid ester as illustrated in the following reaction scheme.

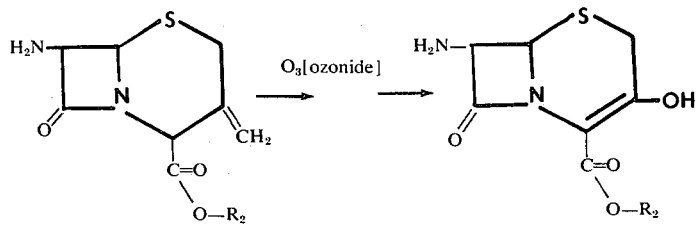

wherein $R_2$ is a carboxylic acid protecting ester group.

The ozonolysis is carried out by bubbling ozone into the cold solution of the 3-exomethylenecepham ester until ozonide formation is complete.

Ozone gas is prepared by means of an ozone generator of the type commonly used in synthetic and analytical chemical work to produce ozone by the action of an electric discharge on oxygen. One such ozone generator is that manufactured by the Wellsback Corporation. The ozone is generated in a stream of oxygen which is then passed directly into the reaction vessel. The percentage of ozone contained in the oxygen stream can be varied as desired, for example, by varying the rate of flow of oxygen through the ozonizer as well as by varying the intensity of the electric discharge. The percentage of ozone in the oxygen stream can be determined iodometrically by titrating with sodium thiosulfate the amount of iodine liberated from a standard solution of potassium iodide by ozone from the generator. The percentage of ozone in the oxygen stream is not critical, however for convenience in carrying out the ozonolysis method of this invention an estimate of the amount of ozone flowing into the reaction mixture enables one to determine the time at which the desired reaction should be complete and thus avoids the formation of overoxidation products.

Alternatively, the ozonolysis can be followed chromatographically. For instance, a small aliquot of the reaction mixture is withdrawn, during the course of the ozonolysis, the ozonide decomposed, and the amount of 3-hydroxy-3-cephem product and starting material present in the sample determined by a comparison of the thin layer chromatogram with that of a known amount of starting material and 3-hydroxy-3-cephem compound.

Inert solvents which can be used in the ozonolysis method of this invention are those solvents in which the 3-exomethylenecepham esters are at least partially soluble and which are unreactive with ozone under the described conditions. Commonly used organic solvents such as methanol, ethanol, ethyl acetate, methyl acetate, iso-amyl acetate, and methylene chloride are satisfactory.

The concentration of the starting material in the inert solvent is not critical and it is preferred to use a solvent volume sufficient to form a complete solution.

When ozonide formation is complete as determined by either method described above, any excess ozone present in the reaction mixture is purged from the mixture by bubbling nitrogen or oxygen through the mixture.

Following the removal of any excess ozone, the ozonide is decomposed by adding to the reaction mixture a reducing reagent selected from the group consisting of sodium bisulfite, sulfur dioxide, and trimethyl phosphite to provide the 3-hydroxy-3-cephem-4-carboxylic acid ester. The decomposition is carried out by adding an excess of the decomposition reagent and then stirring the reaction mixture until the reaction mixture is negative in the potassium iodide-starch test.

A preferred reagent for decomposing the intermediate ozonide is gaseous sulfur dioxide. This reagent is preferred since it is completely volatilized from the reaction mixture during the subsequent work-up and thus does not complicate the recovery of the reaction product.

The 7-amino-3-hydroxy-3-cephem-4-carboxylic acid esters are recovered from the reaction mixture by evaporation of the mixture and isolating the product from the residue, usually as the hydrochloride salt.

Illustrative of the 7-amino-3-exomethylenecepham esters which can be employed are p-nitrobenzyl 7-amino-3-exomethylenecepham-4-carboxylate hydrochloride, p-methoxybenzyl 7-amino-3-exomethylenecepham-4-carboxylate hydrochloride, and 2,2,2-trichloroethyl 7-amino-3-exomethylenecepham-4-carboxylate hydrochloride. These starting esters are preferably used in the salt form, for example as the hydrochlorides.

Illustrative of the 7-amino-3-hydroxy-3-cephem-4-carboxylic acid esters are p-nitrobenzyl 7-amino-3-hydroxy-4-cephem-4-carboxylate, p-methoxybenzyl 7-amino-3-hydroxy-3-cephem-4-carboxylate, and 2,2,2-trichloroethyl 7-amino-3-hydroxy-3-cephem-4-carboxylate.

The 3-hydroxy-3-cephem esters are desirably recovered and purified as the hydrochloride salts.

When in the foregoing ozonolysis of a 3-exomethylenecepham ester the reaction proceeds beyond the preparation of the intermediate ozonide, for example, when an excess of ozone is allowed to remain in the reaction mixture, overoxidation products such as the 3-hydroxy-3-cephem sulfoxide ester of the formula

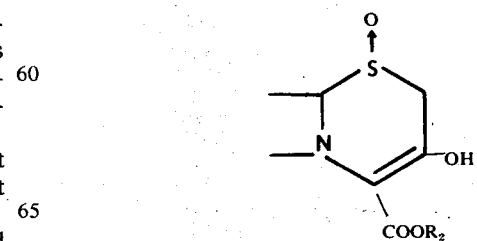

can be formed.

The 7-amino-3-hydroxy-3-cephem-4-carboxylic acid esters are then alkylated at the 3-hydroxy group to provide the 3-alkoxy-3-cephem esters. The alkoxylation is carried out by reacting the 3-hydroxy ester with a diazo compound, namely diazomethane, diazoethane or 1-diazo-3-methyl-2-butene. Also the 3-hydroxy-3-cephem esters can be alkylated with methyl iodide in the presence of a base, with an alkyl ester of sulfuric acid in the presence of a base, for example with dimethyl or diethylsulfate, or with trimethyl oxonium fluoroborate. Likewise, activated halo compounds in the presence of a base can also be used to alkylate the 3-hydroxy-3-cephem esters. For example, the α-haloethers such as chloromethyl methyl ether, and bromomethyl ethyl ether; α-haloacid esters such as ethyl bromoacetate, methyl chloroacetate and ethyl α-bromopropionate and the allylic halides such as allyl bromide, allyl chloride and 1-bromo-3-methyl-2-butene can react with the 3-hydroxy-3-cephem esters to provide respectively the 3-alkoxymethoxy, the 3-carbalkoxymethoxy and the 3-allyloxy ether derivatives thereof. The preferred alkylating reagents are the diazo compounds, diazomethane, diazoethane and 1-dizao-3-methyl-2-butene. These diazo compounds react with the 3-hydroxy-3-cephem esters to provide the 3-ethers without side-reaction product contamination. Other alkylating agents, for example the activated halo compounds described above, react to provide mixtures of the desired 3-ether with 4-alkylated-3-hydroxy-2-cephem-4-carboxylates and 4-alkylated-3-alkoxy-2-cephem-4-carboxylates. Such mixtures can be separated chromatographically to provide the desired 3-ether ester.

The etherification reaction is carried out by adding an ethereal solution of one of the preferred diazo compounds to a solution of the 3-hydroxy ester in an inert solvent. The etherification proceeds at a satisfactory rate at a temperature between about 20° and 25°C. An excess of the diazo compound is desirably employed.

Representative of the 7-amino-3-alkoxy nucleus esters which can be prepared and used in this invention are p-nitrobenzyl 7-amino-3-methoxy-3-cephem-4-carboxylate, p-methoxybenzyl 7-amino-3-methoxy-3-cephem-4-carboxylate, p-nitrobenzyl 7-amino-3-ethoxy-3-cephem-4-carboxylate, 2,2,2-trichloroethyl 7-amino-3-methoxy-3-cephem-4-carboxylate, p-methoxybenzyl 7-amino-3-(3-methyl-2-butenyl-1-oxy)-3-cephem-4-carboxylate and p-methoxybenzyl 7-amino-3-ethoxy-3-cephem-4-carboxylate.

The 7-amino-3-cephem ether acids or esters, prepared as described above, are then acylated with an active derivative of a phenyl or heterocyclic substituted glycine represented by the formula

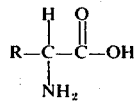

wherein R is as defined for Formula I. The acylation can be carried out by following the known methods for the acylation of 7-aminocephalosporanic acid and 7-aminodeacetoxycephalosporanic acid. For example, the acid chloride hydrochloride can be reacted with the 7-amino ether nucleus in the presence of a hydrogen halide acceptor. Hydrogen halide acceptors such as the tertiary amines pyridine and triethylamine can be used, however the alkylene oxides such as ethylene oxide and propylene oxide are preferred hydrogen halide acceptors in that racemization of the active D-configuration of the D-phenyl, D-thienyl or D-furyl glycyl halide does not occur with these acceptors. Alternatively, the free acid of an amino protected phenyl, thienyl or furyl substituted glycine can be condensed with the amino ether nucleus in the presence of a condensing agent such as a carbodiimide, for example, dicyclohexylcarbodiimide. Also a mixed anhydride formed with the acylating acid and an acid such as formic or acetic acid can be used as the acylation reagent in the presence of a condensing agent such as N-ethoxycarbonyl-2-ethoxy-1,2-dihydroquinoline (EEDQ).

By other known acylation methods an activated derivative of the phenyl, thienyl or furylglycine such as an active ester, for example, a pentachlorophenyl ester, or an azide can be used. In general, any of the known amide coupling methods can be used in the preparation of the compounds of the invention.

Illustrative of the phenyl and heterocyclic substituted glycines which can be used to acylate the 7-amino ether nucleus are the following: D-phenylglycyl chloride hydrochloride, D-4-hydroxyphenylglycyl chloride hydrochloride, 2-thienylglycyl chloride hydrochloride, 3-thienylglycyl chloride hydrochloride, 2-furylglycyl chloride hydrochloride, N-(t-butyloxycarbonyl)-D-phenylglycine, N-(1-carbomethoxy-2-propenyl)-D-phenylglycine, and N-(t-butyloxycarbonyl)-2-thienylglycine.

Other amino protecting groups such as the p-methoxybenzyloxycarbonyl, benzyloxycarbonyl and 2,2,2-trichloroethoxycarbonyl groups can be used to protect the amino group of the acylating agent. Any of the generally used amino protecting groups can be employed, the function of such groups being merely to protect the reactive amino function during the acylation reaction.

In a specific embodiment of this invention p-nitrobenzyl 7-amino-3-exomethylenecepham-4-carboxylate hydrochloride is reacted in methanol with ozone at dry ice-acetone temperature. Following the ozonolysis the reaction mixture is purged of excess ozone with nitrogen or oxygen and is then treated with sulfur dioxide to decompose the ozonide and provide p-nitrobenzyl 7-amino-3-hydroxy-3-cephem-4-carboxylate hydrochloride.

The 3-hydroxy nucleus ester is reacted in methylene chloride with an ethereal solution of diazomethane to provide p-nitrobenzyl 7-amino-3-methoxy-3-cephem-4-carboxylate.

The 7-amino-3-methoxy-3-cephem ester is then acylated with the mixed anhydride formed with N-(1-carbomethoxy-2-propenyl)-D-phenylglycine and methyl chloroformate in the presence of dimethylbenzylamine at about 25°C. to provide 7-[N-(1-carbomethoxy-2-propenyl)-D-phenylglycylamido]-3-methoxy-3-cephem-4-carboxylate. The amino protecting group is then removed by acid hydrolysis and the p-nitrobenzyl ester group is removed by catalytic hydrogenolysis with hydrogen in the presence of 5% palladium on carbon catalyst at pH 2.5 to yield 7-(D-phenylglycylamido)-3-methoxy-3-cephem-4-carboxylic acid (Formula I, R = phenyl, $R_1$ = methyl and $R_2$ = H).

The antibiotics of the invention can be prepared alternatively, by first acylating a 7-amino-3-hydroxy-3-cephem ester prepared as described above and then reacting the 7-(phenyl, thienyl or furylglycylamido)-3-hydroxy-3-cephem-4-carboxylic acid product with one of the aforementioned diazo compounds. The acylation of a 3-hydroxy nucleus ester can be carried out by the methods previously described as useful for the acylation of a 7-amino ether nucleus. However, it is preferred to acylate the 3-hydroxy nucleus ester under nonanhydrous acylation methods. When an anhydrous method of acylation is employed N,O-diacylation occurs to some extent to provide a mixture of the desired N-acylated product and the N,O-diacylated product, for example the diacylated product represented by the following generalized formula

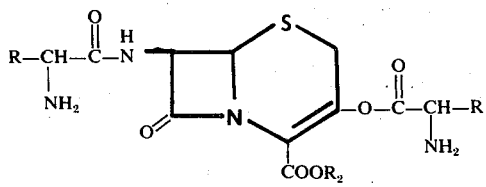

wherein R is as defined above and $R_2$ is an ester group. Under non-anhydrous conditions, for example, when the acylation is carried out in wet acetone, wet acetonitrile or with mixtures of water and water immiscible organic solvents, N-acylation occurs exclusively.

The 7-amino-3-hydroxy-3-cephem esters and the 7-($\alpha$-aminoacylamido)-3-hydroxy-3-cephem esters prepared as described herein can be characterized as enols. As such they exist in equilibrium with the 3-ketocepham esters as represented in the following scheme.

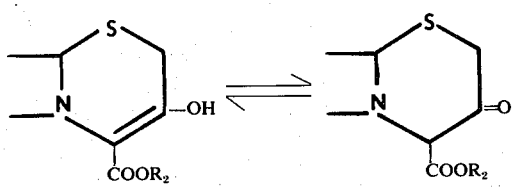

The existence of the keto form is evidenced by the lower absorption of these compounds in the 260 m$\mu$ region of the ultraviolet spectrum, the characteristic absorption exhibited by the 3-cephem system.

In a further specific embodiment of this invention, p-methoxybenzyl 7-amino-3-hydroxy-3-cephem-4-carboxylate is acylated with N-(t-butyloxycarbonyl)-D-phenylglycine in the presence of EEDQ to provide p-methoxybenzyl 7-[N-(t-butyloxycarbonyl)-D-phenylglycylamido]-3-hydroxy-3-cephem-4-carboxylate. The acylated product is reacted with diazomethane in methylene chloride to provide the ether, p-methoxybenzyl 7-[N-(t-butyloxycarbonyl)-D-phenylglycylamido]-3-methoxy-3-cephem-4-carboxylate. The p-methoxybenzyl group and the t-butyloxycarbonyl amino protecting group are removed with trifluoroacetic acid in anisole or p-toluenesulfonic acid in acetonitrile to provide, 7-(D-phenylglycylamido)-3-methoxy-3-cephem-4-carboxylic acid (Formula I, R = phenyl, $R_1$ = methyl and $R_2$ = H).

Alternatively, the antibiotics provided herein can be prepared by employing a 7-(phenyl, thienyl or furylglycylamido)-3-exomethylenecepham-4-carboxylic acid ester as the starting material. According to this method the $\alpha$-amine group in the side chain is protected with a readily removable amino blocking group for example, the t-butyloxycarbonyl group, the 1-carbomethoxy-2-propenyl group, and the 2,2,2-trichloroethoxycarbonyl group, and the protected compound is reacted with ozone. The intermediate ozonide is decomposed to provide the correspondingly substituted 3-hydroxy-3-cephem ester. Alkylation of the 3-hydroxy-3-cephem ester and preferably alkylation with a diazo compound, for example diazomethane, yields the 3-methoxy-(ethoxy or 3-methyl-2-butenyl-1-oxy)-3-cephem-4-carboxylic acid ester. The carboxylic acid protecting ester group and the amino protecting group are removed by known procedures to provide the antibiotic compound of the invention. For example, p-nitrobenzyl 7-[N-(t-butyloxycarbonyl)-D-phenylglycylamido]-3-exomethylenecepham-4-carboxylate is reacted with ozone as described above, the intermediate ozonide is decomposed with sulfur dioxide to provide p-nitrobenzyl 7-[N-(t-butyloxycarbonyl)-D-phenylglycylamido]-3-hydroxy-3-cephem-4-carboxylate. The 3-hydroxy ester is reacted with diazomethane to provide the 3-methoxy derivative. The p-nitrobenzyl ester group is removed from the 3-methoxy derivative by reacting the ester with hydrogen in the presence of 5% palladium on carbon in an acidic medium, and thereafter the t-butyloxycarbonyl group is removed by acid hydrolysis to provide the antibiotic 7-(D-phenylglycylamido)-3-methoxy-3-cephem-4-carboxylic acid.

Following the same procedures the corresponding thienyl and furyl substituted glycyl amides are prepared.

The following compounds are illustrative of the antibiotic compounds of the invention.

7-(D-Phenylglycylamido)-3-methoxy-3-cephem-4-carboxylic acid,
7-(D-3-hydroxyphenylglycylamido)-3-methoxy-3-cephem-4-carboxylic acid,
7-(D-4-hydroxyphenylgylcylamido)-3-methoxy-3-cephem-4-carboxylate,
7-(D-2-hydroxyphenylglycylamido)-3-methoxy-3-cephem-4-carboxylic acid,
7-(D-4-methylphenylglycylamido)-3-methoxy-3-cephem-4-carboxylic acid,
7-(D-4-chlorophenylglycylamido)-3-methoxy-3-cephem-4-carboxylic acid,
7-(D-3-methoxyphenylglycylamido)-3-methoxy-3-cephem-4-carboxylic acid,
7-(D-phenylglycylamido)-3-ethoxy-3-cephem-4-carboxylic acid,
7-(D-phenylglycylamido)-3-(3-methyl-2-butenyl-1-oxy)-3-cephem-4-carboxylic acid,
7-(D-2-thienylglycylamido)-3-methoxy-3-cephem-4-carboxylic acid,
7-(D-2-furylglycylamido)-3-methoxy-3-cephem-4-carboxylic acid,
7-(D-3-thienylglycylamido)-3-methoxy-3-cephem-4-carboxylic acid, and
7-(D-2-thienylglycylamido)-3-ethoxy-3-cephem-4-carboxylic acid.

A preferred group of antibiotics of this invention are the 3-methoxy-3-cephem acids, Formula I, $R_1$ = methyl and $R_2$ = H).

Among the preferred 3-methoxy-3-cephem acids the 7-(D-hydroxyphenylglycylamido)-3-methoxy-3-cephem-4-carboxylic acids are a further preferred group of antibiotics.

The antibiotics provided by this invention inhibit the growth of microorganisms pathogenic to man and animals. These antibiotics are a particularly useful class of antibiotics in that they are effective in combating infections caused by gram-positive and gram-negative microorganisms when administered parenterally or orally.

An especially preferred antibiotic compound of this invention is 7-(D-phenylglycylamido)-3-methoxy-3-cephem-4-carboxylic acid.

In Table I, which follows, the minimum inhibitory concentration (MIC) for this compound against clinical isolates of penicillin resistant Staphylococcus, both in the presence and absence of serum, are listed. The MIC values were determined by the Gradient Plate technique (Bryson and Szybalski, Science, 116, 45 (1952).

Table I 7-(D-Phenylglycylamido)-3-methoxy-3-cephem-4-carboxylic acid
Antibiotic Activity vs. Penicillin Resistant *Staphylococcus*

| Clinical Isolate | Minimum Inhibitory Concentration (mcg/ml) | |
| --- | --- | --- |
| | Absent Serum | Serum |
| V- 41 | 11.4 | >20 |
| V- 32 | 18.4 | >20 |
| X-400[1] | >20 | >20 |
| V- 84 | 4.4 | 11.2 |
| X- 1.1 | 0.6 | 0.5 |

[1]Methicillin resistant *Staphylococcus*.

In Table II below, the MIC values for 7-(D-phenylglycylamido)-3-methoxy-3-cephem-4-carboxylic acid against representative gram-negative organisms is presented. The data were obtained by the Gradient Plate technique.

Table II

Antibiotic Activity vs. Gram-Negative Organisms

| organism | Minimum Inhibitory Concentration (mcg/ml) |
| --- | --- |
| *Shigella sp.* | 7.2 |
| *Escherichia coli* | 6.6 |
| *Klebsiella pneumoniae* | 5.1 |
| *Aerobacter aerogenes* | 3.6 |
| *Salmonella heidelberg* | 3.8 |
| *Pseudomonas aeruginosa* | >200 |
| *Serratia marcescens* | 124 |

The antimicrobial activity exhibited by 7-(D-phenylglycylamido)-3-methoxy-3-cephem-4-carboxylic acid is illustrative of the activity of the compounds of the invention.

As previously mentioned the highly preferred compound of this invention, 7-(D-phenylglycylamido)-3-methoxy-3-cephem-4-carboxylic acid is a highly effective antibiotic when administered orally. For example the $ED_{50}$ values listed below were obtained with the above named compound in mice infected with the listed microorganisms.

| Microorganism | $ED_{50}$ (mg/kg. oral) |
| --- | --- |
| *Staphylococcus pyogenes* | 1.0 |
| *Diplococcus pneumoniae* | 24.1 |
| *Staphylococcus aureus* | 5.2 |
| *Escherichia coli* | 12.2 |

The $ED_{50}$ values were determined as described by W. E. Wick et al., Journal of Bacteriology, 81 [No. 2] 233–235 (1961).

The antibiotic compounds of this invention can be administered in the free acid form or in the form of a pharmaceutically acceptable non-toxic salt such as the sodium or potassium salt. Such salts are prepared by reacting the antibiotic acid with a suitable base such as sodium carbonate, sodium bicarbonate, sodium hydroxide, potassium carbonate and like bases.

For example, the highly preferred antibiotic is effective in combating inventions when administered orally at a dose between about 100 and 500 mg g.i.d. The antibiotic can be administered in a suitable oral pharmaceutical form for example in gelatin capsules.

The following examples are provided to further illustrate the invention.

EXAMPLE 1 p-Nitrobenzyl 7-amino-3-methylenecepham-4-carboxylate hydrochloride

To a solution of 965 mg. (2 mmole) of p-nitrobenzyl 7-phenoxyacetamido-3-methylenecepham-4-carboxylate in 10 ml. of methylene chloride were added 175 mg of dry pyridine and 460 mg. of phosphorus pentachloride and the mixture was stirred at room temperature for 6 hours. One ml. of isobutanol was added to the mixture which was then stored at 0°C. overnight. The reaction product, p-nitrobenzyl 7-amino-3-methylenecepham-4-carboxylate hydrochloride, which formed as a crystalline precipitate was filtered to yield 430 mg. (58% yield).

Elemental Analysis for $C_{15}H_{16}N_3O_5SCl$. Theory: C, 46.69; H, 4.18; N, 10.89. Found: C, 46.40; H, 4.20; N, 10.62.

I.R. (Nujol Mull). Carbonyl absorption at 5.65 ($\beta$-lactam) and 5.75 (ester) microns.

N.M.R. (DMSO $d_6$) signals at 6.34 (2d, 2H, $C_2$-$H_2$), 4.98. (d, 1H, $C_6$-H); 4.7-4.4 (m, 6H, $C_4$-H, ester $CH_2$, $C_4$-$CH_2$ and $C_7$-H); and 2.4–1.6 (m, 4H, aromatic H) tau.

EXAMPLE 2 p-Nitrobenzyl 7-amino-3-methylenecepham-4-carboxylate-p-toluenesulfonate salt.

To a solution of 965 mg. of p-nitrobenzyl 7-phenoxyacetamido-3-methylenecepham-4-carboxylate in 10 ml. of methylene chloride were added 175 mg. of dry pyridine and 460 mg. of phosphorus pentachloride and the mixture was stirred for five hours at room temperature. Thereafter the reaction mixture was cooled to 0°C. and 50 ml. of cold methanol were added. Following a stirring period of 1 hour at room temperature the reaction mixture was evaporated in vacuo to remove the solvents and the residual reaction product mixture was dissolved in a mixture of ethyl acetate and water. The pH was adjusted to pH 7 and the ethyl acetate layer was separated and was washed with water and dried. One-equivalent of p-toluene sulfonic acid was added to the dried solution and on cooling 600 mg. of p-nitrobenzyl 7-amino-3-methylenecepham-4-carboxylate p-toluenesulfonate formed as a crystalline precipitate. The product was purified by recrystallization from a mixture of 12 ml. of methanol 24 ml. of ether and 15 ml. of petroleum ether.

Elemental analysis for $C_{22}H_{23}N_3O_8S_2$: Theory: C, 50.66; H, 4.45; N, 8.06. Found: C, 50.41; H, 4.51; N, 7.86.

I.R. (Nujol Mull). carbonyl absorption at 5.65 ($\beta$-lactam) and 5.71 (ester) microns N.M.R. (DMSO $d_6$). Signals at 7.70 (s, 3H, p-methyl); 6.39 (s, 2H, $C_2$-$H_2$); 4.98 (d, 1H, $C_6$-H);

4.7-4.3 (m, 6H C$_4$-H, ester CH$_2$; C$_3$-CH$_2$, and C$_7$-H); and 2.93–1.68 (m, 8H, aromatic H) tau.

U.V. (pH 6 buffer) Maxima at 219 m$\mu$ ($\epsilon$=19,600) and 268 m$\mu$ ($\epsilon$= 9,400).

EXAMPLE 3 p-Methoxybenzyl 7-amino-3-methylenecepham-4-carboxylate hydrochloride

To a solution of 4.3 g. of p-methoxybenzyl 7-phenoxyacetamido-3-methylenecepham-4-carboxylate in 50 ml. of methylene chloride were added 880 mg. of dry pyridine and 2.3 g. of phosphorus pentachloride and the mixture was stirred at the reflux temperature for 3 hours. The reaction mixture was then cooled in an ice-water bath and 5 ml. of isobutanol were added. The mixture was stirred in the cold for several hours during which time 2.2 g. of the reaction product, p-methoxybenzyl 7-amino-3-methylenecepham-4-carboxylate hydrochloride, precipitated from the mixture. The product was filtered and washed with cold methylene chloride and was dried in vacuo.

Elemental analysis for C$_{16}$H$_{19}$N$_2$O$_4$SCl: Theory: C, 51.82; H, 5.16; N, 7.55. Found: C, 51.65; H, 5.04; N, 7.72.

EXAMPLE 4 p-Methoxybenzyl 7-amino-3-methylenecepham-4-carboxylate-p-toluenesulfonate

To a solution of 937 mg. of p-methoxybenzyl 7-phenoxyacetamido-3-methylenecepham-4-carboxylate in 10 ml. of methylene chloride was added 0.18 ml. of dry pyridine and 460 mg. of phosphorus pentachloride. The mixture was stirred at room temperature for 2 hours and was then cooled to 5°C. To the cold mixture was added 50 ml. of cold methanol and the mixture was allowed to warm to room temperature. The reaction mixture was evaporated in vacuo and the residue was dissolved in a mixture of ethyl acetate and water. The pH of the solution was adjusted to pH 7 and the ethyl acetate layer was separated, washed with water and dried. To the dried ethyl acetate layer was added one equivalent of p-toluene sulfonic acid. On cooling 600 mg. of p-methoxybenzyl 3-methylenecepham-4-carboxylate p-toluenesulfonate precipitated as a crystalline solid.

Elemental analysis for C$_{23}$H$_{26}$N$_2$O$_6$S$_2$: Theory: c, 54.53; H, 5.17; N, 5.53. Found: C, 54.33; H, 5.05; N, 5.47.

I.R. (Nujol Mull): Carbonyl absorption band at 5.65 ($\beta$-lactam) and 5.78 (ester) microns.

N.M.R. (DMSO d$_6$):
Signals at 7.69 (s, 3H, para methyl)
6.41 (s, 2H, C$_2$—H$_2$)
6.23 (s, 3H, para methoxy)
5.0 (d, 1H, C$_6$—H)
4.82 (s, 2H, ester CH$_2$)
4.7–4.55 (m, 4H, C$_4$—H, C$_3$—CH$_2$ and C$_7$—H)
3.2–2.0 (m, 8H, aromatic H) tau.

EXAMPLE 5 p-Nitrobenzyl 7-amino-3-hydroxy-3-cephem-4-carboxylate hydrochloride

A solution of 3.85 g. of p-nitrobenzyl 7-amino-3-methylenecepham-4-carboxylate hydrochloride, prepared as described by Example 1, in 600 ml. of methanol was cooled in an acetone-dry ice bath. Ozone was bubbled through the reaction mixture for approximately 20 minutes at which time the reaction mixture developed a faint blue coloration. Nitrogen was then passed through the reaction mixture to expel excess ozone. Next, the intermediate ozonide was decomposed by passing sulfur dioxide gas through the reaction mixture until the mixture gave a negative potassium iodide-starch test.

The reaction mixture was evaporated in vacuo and the residue was dissolved in 200 ml. of 0.1N hydrogen chloride in methylene chloride. The solution was evaporated to dryness and the residual reaction product was dissolved in acetone. On cooling, 3.15 g. of p-nitrobenzyl 7-amino-3-hydroxy-3-cephem-4-carboxylate hydrochloride precipitated as a crystalline solid.

I.R. (Nujol Mull): Carbonyl absorption at 5.55 ($\beta$-lactam carbonyl) and 5.02 (ester carbonyl hydrogen bonded to 3 hydroxy) microns.

Electrometric titration (66% DMF) pKa 4.0 and 6.3

EXAMPLE 6 p-Nitrobenzyl 7-amino-3-hydroxy-3-cephem-4-carboxylate hydrochloride

A solution of 4 g. of p-nitorbenzyl 7-amino-3-methylenecepham-4carboxylate hydrochloride in 620 ml. of methanol was cooled in a dry ice-acetone bath and ozone was bubbled through the cold solution for about 20 minutes. The reaction mixture was purged of the remaining ozone by passing nitrogen through the solution and 10 g. of sodium bisulfite were added.

The reaction mixture was stirred for one hour at ice-bath temperature at which time the mixture gave a negative potassium iodide starch test.

The mixture was evaporated in vacuo to yield the reaction product as an amorphous yellow residue. The residue was crystallized in acetone to yield 3.4 g. of p-nitrobenzyl 7-amino-3-hydroxy-3-cephem-4-carboxylate hydrochloride as a crystalline acetone solvate.

I.R. (Nujol Mull): Carbonyl absorption bands at 5.60 ($\beta$-lactam) and 6.04 (ester carbonyl hydrogen bonded to 3 hydroxy) microns.

N.M.R. (DMSO d$_6$):
signals at 7.92 (s, 3H, 1/2 mole acetone),
6.22 (2d, 2H, C$_2$—H$_2$),
5.07 (d, 1H, C$_6$H),
4.8–4.5 (m, 3H, ester CH$_2$ and C$_7$H),
2.4–1.6 (m, 4H, aromatic H) tau.

EXAMPLE 7 p-Nitrobenzyl 7-amino-3-hydroxy-3-cephem-4-carboxylate hydrochloride

Following the ozonization procedure described by Examples 5 and 6, 3.85 g. of p-nitrobenzyl 7-amino-3- methylenecepham-4-carboxylate hydrochloride was ozonized in methanol and the intermediate ozonide was decomposed at a temperature of 0°C. with 3.5 ml. of trimethyl phosphite. The reaction mixture was evaporated and the residue was dissolved in 100 ml. of 0.1N HCl in methylene chloride. The said solution was evaporated and the residue was crystallized from acetone to yield 2.8 g. of p-nitrobenzyl 7-amino-3-hydroxy-3-cephem-4-carboxylate hydrochloride.

EXAMPLE 8 p-Nitrobenzyl 7-amino-3-hydroxy-3-cephem-4-carboxylate.

Four millimole of p-nitrobenzyl 7-amino-3-hydroxy-3-cephem-4-carboxylate hydrochloride, prepared as described in Example 5, was dissolved in water and ethyl acetate was added to the solution. The pH of the slurry was adjusted from pH 2.2 to pH 5 with 1N sodium hydroxide. The ethyl acetate layer was separated and was washed with water and dried over magnesium sulfate. The dried ethyl acetate layer was evaporated to dryness to yield 1.2 g. of p-nitrobenzyl 7-amino-3-hydroxy-3-cephem-4-carboxylate as a crystalline residue.

Elemental analysis for: $C_{14}H_{13}N_3O_6S$: Theory: C, 47.86; H, 3.73; N, 11.96. Found: C, 47.87; H, 4.00; N, 12.11.

I.R. (Nujol Mull): Carbonyl absorption at 5.65 (broad, β-lactam and ester) and 6.0 (amide) microns.

N.M.R. (DMSO $d_6$):
signals at  6.63 (2d, 2H, $C_2H$),
5.31 (d, 1H, $C_6H$),
4.89 (d, 1H, $C_7H$),
4.62 (s, 2H, ester $CH_2$),
4.30 (broad s, 2H, 7 N-H),
2.5–1.8 (m, 4H, aromatic H) and
1.2 (d, 1H, $C_3OH$) tau.

EXAMPLE 9 p-Nitrobenzyl 7-amino-3-methoxy-3-cephem-4-carboxylate

To a stirred suspension of 445 mg. of p-nitrobenzyl 7-amino-3-hydroxy-3-cephem-4-carboxylate hydrochloride (prepared as described by Example 5) in 35 ml. of dry tetrahydrofuran was added one equivalent of triethylamine followed by 10 ml. of an ethereal solution of diazomethane in excess. After 30 min. the solvent and excess diazomethane were evaporated and the residue was dissolved in a mixture of water and ethyl acetate. The organic layer was separated and was washed with water and dried. The dried ethyl acetate solution was evaporated to dryness to yield 310 mg. of p-nitrobenzyl 7-amino-3-methoxy-3-cephem-4-carboxylate. The product was obtained crystalline by trituration with diethyl ether.

Elemental analysis for $C_{15}H_{15}N_3O_6S$: Theory: C, 49.31; H, 4.14; N, 11.50. Found: C, 49.51; H, 4.40; N, 11.25.

I.R. (Nujol Mull): absorption peaks at 2.99 (amide), 5.75 (broad, β-lactam and ester carbonyl), and 5.98 (amide carbonyl) microns.

U.V. (ethanol) absorption maximum 268 mμ, ε=14,600.

N.M.R. (DMSO $d_6$): signals at 7.10 (broad s, 2H, $C_7NH_2$), 6.22 (s, 2H, $C_2H_2$), 6.20 (s, 3H, $C_3$ methexyl), 5.27 (d, 1H, $C_6H$), 4.93 (d, 1H, $C_7H$), 4.60 (s, 2H, ester $CH_2$), and 2.35–1.6 (q, 4H, aromatic H) tau.

EXAMPLE 10 p-Nitrobenzyl 7-amino-3-methoxy-3-cephem-4-carboxylate hydrochloride.

To a stirred suspension of 445 mg. of p-nitrobenzyl 7-amino-3-hydroxy-3-cephem-4-carboxylate hydrochloride in 30 ml. of methylene chloride was added 131 mg. of mono-trimethylsilyl acetamide and the mixture was stirred at room temperature for 30 min. An ethereal solution of excess diazomethane was added and after 20 min. the mixture was evaporated to remove solvent and excess diazomethane. The residue was treated with 1 ml. of methanol and then dissolved in an ethyl acetate-water mixture. The ethyl acetate layer was separated, washed with water and dried. Hydrogen chloride was passed through the dried ethyl acetate layer to precipitate the reaction product, p-nitrobenzyl 7-amino-3-methoxy-3-cephem-4-carboxylate hydrochloride.

N.M.R. (DMSO $d_6$): signals at 6.97 (broad s, 3H, $NH_3^+$), 6.31 (s, 2H, $C_2$-$H_2$), 6.23 (s, 3H, $C_3$ methoxyl), 5.39 (d, 1H, $C_6H$), 5.05 (d, 1H, $C_7H$) and 2.5–1.92 (q, 4H, aromatic H) tau.

EXAMPLE 11 p-Nitrobenzyl 7-[N-(t-butyloxycarbonyl)-D-phenylglycylamido]-3-methoxy-3-cephem-4-carboxylate A mixture of 365 mg. of p-nitrobenzyl 7-amino-3-methoxy-3-cephem-4-carboxylate, 256 mg. of N-(t-butyloxycarbonyl)-D-α-phenylglycine, and 273 mg. of N-ethoxycarbonyl-2-ethoxy-1,2-dihydroquinoline, in 20 ml. of THF and 10 ml. of acetone was stirred at room temperature for 16 hours. The reaction mixture was evaporated to remove volatiles and the residue was dissolved in a mixture of water and ethyl acetate. The ethyl acetate layer was separated and was washed with 5% hydrochloric acid and water and was dried. The dried layer was then evaporated to dryness and the product obtained crystalline by trituration of the residue with diethyl ether.

Elemental analysis for $C_{28}H_{30}N_4O_9S$: Theory: C, 56.18; H, 5.05; N, 9.36. Found: C, 55.95; H, 5.16; N, 9.30.

I.R. (Nujol Mull): absorption peaks at 3.01 (amide NH), 5.67, 5.84, 5.90 and 6.06 (carbonyl) microns.

N.M.R. (CDCl$_3$): signals at 8.60 (s, 9H, t-butyl), 6.75 (s, 2H, $C_2H_2$), 6.23 (s, 3H, $C_3$ methoxyl), 5.20–3.90 (m, 5H, $C_6H$, side-chain $CH_2$, ester $CH_3$ and $C_7H$), 2,80–1.70 (m, 9H, aromatic H) tau.

EXAMPLE 12

7-(D-Phenylglycylamido)-3-methoxy-3-cephem-4-carboxylic acid

A solution of 600 mg. of p-nitrobenzyl 7-[N-(t-butyloxycarbonyl)-D-α-phenylglycylamido]-3-methoxy-3-cephem-4-carboxylate (prepared as described in Example 11) in 25 ml. of THF and 60 ml. of methanol containing 3 drops of 1H hydrochloric acid was hydrogenated at room temperature under 50 psi hydrogen pressure for 3 hr. in the presence of 600 mg. of pre-reduced 5% palladium-on-carbon.

The catalyst was filtered and was washed with THF. The filtrate and wash were combined and evaporated to dryness in vacuo. The residue was dissolved in a mixture of water and ethyl acetate and the solution was cooled in an ice-water bath. The pH of the cold solution was adjusted to pH 2.5 and the ethyl acetate layer separated. The ethyl acetate layer was washed, dried and evaporated to dryness to yield 7-[N-(t-butyloxycarbonyl)-D-α-phenylglycylamido]-3-methoxy-3-cephem-4-carboxylic acid as a pale yellow amorphous solid.

The carboxylic acid product was dissolved in 5 ml. of acetonitrile and 380 mg. of p-toluenesulfonic acid monohydrate were added to the solution. The mixture was allowed to stand at room temperature for 3 hr. Thereafter 1 ml. of water was added to the mixture and the pH was adjusted to pH 4.5 with triethylamine.

On cooling, 7-(D-α-phenylglycylamido)-3-methoxy-3-cephem-4-carboxylic acid precipitated as a crystalline solid.

EXAMPLE 13 p-Nitrobenzyl 7-[N-(1-carbomethoxy-2-propenyl)-D-phenylglycylamido]-3-methoxy-3-cephem-4-carboxylate.

To 45 ml. of acetonitrile containing 6 drops of dimethylbenzylamine were added 815 mg. of methyl 3-α-carboxybenzylaminocrotonate sodium salt and the mixture was cooled in a dry ice-carbon tetrachloride bath.

To the cold solution were added with stirring 303 mg. of methyl chloroformate and after 20 min. a solution of 1.1 g. of p-nitrobenzyl 7-amino-3-methoxy-3-cephem-4-carboxylate in 45 ml. of acetone was added. The reaction mixture was stirred in the cold for 30 min. and then at room temperature for 2 hr.

The reaction mixture was filtered and evaporated in vacuo. The residue was dissolved in ethyl acetate and the solution was washed with water and dried over magnesium sulfate. The dried solution was evaporated to dryness and the residue recrystallized from ethanol to yield 1.1 g. of crystalline reaction product, p-nitrobenzyl 7-[N-(1-carbomethoxy-2-propenyl)-D-phenylglycylamido]-3-methoxy-3-cephem-4-carboxylate, melting at about 135° to 145°C. with decomposition.

Elemental analysis for $C_{28}H_{28}N_4O_9S$: Theory: C, 56.37; H, 4.73; N, 9.39. Found: C, 56.09; H, 4.57; N, 9.27.

EXAMPLE 14

7-(D-α-Phenylglycylamido)-3-methoxy-3-cephem-4-carboxylic acid

A solution of 500 mg. of p-nitrobenzyl 7-[N-(1-carbomethoxy-2-propenyl)-D-phenylglycylamido]-3-methoxy-3-cephem-4-carboxylate, prepared as described by Example 13, in 30 ml. of acetonitrile and 15 ml. of water was acidified to pH 1 with concentrated hydrochloric acid and immediately back titrated to pH 2.5 with 1N sodium hydroxide. The mixture was evaporated to dryness and the residue dissolved in a solvent mixture of 40 ml. of THF and 80 ml. of methanol.

The solution was charged into a Parr low pressure hydrogenation apparatus and hydrogenated under a hydrogen pressure of 50 psi at room temperature for 2.5 hr. in the presence of 500 mg. of 5% palladium-on-carbon. The catalyst had been pre-reduced in ethanol for 30 min. under 50 psi hydrogen pressure at room temperature.

The catalyst was filtered and washed with THF and with water. The filtrate and catalyst washes were combined and evaporated in vacuo to remove volatile solvents. The aqueous residue was slurried with ethyl acetate and the pH of the slurry was adjusted to pH 4.5 with 1N sodium hydroxide. The aqueous layer was separated, washed with ethyl acetate and then concentrated in vacuo to a volume of 2 ml.

The aqueous concentrate was diluted with 1 ml. of acetonitrile and the solution was cooled to precipitate 122 mg. of 7-(D-phenylglycylamido)-3-methoxy-3-cephem-4-carboxylic acid as the crystalline dihydrate.

Elemental analysis for $C_{16}H_{17}N_3O_5S \cdot 2H_2O$: Theory: C, 48.10; H, 5.30; N, 10.52. Found: C, 47.80; H, 4.74; N, 10.21.

I.R. (Nujol Mull): absorption peaks at 2.95 (amide NH), 5.75, 5.96 (β-lactam and amide carbonyls), and 6.25 (carboxylate) microns.

N.M.R. (D$_2$O/DCl): signals at 6.58 (2d, 2H, C$_2$H$_2$), 6.10 (s, 3H, C$_3$ methoxyl), 4.87 (d, 1H, C$_6$H), 4.70 (s, 1H, α-CH), 4.54 (d, 1H, C$_7$H) and 2.41 (s, 5H, aromatic H) tau.

U.V. (pH 7 buffer): λ max 265 mμ, ε=7,500.

Electrometric titration (80% aqueous DMF): pKa 6.2 and 7.3.

EXAMPLE 15

Following the procedures described in Examples 13 and 14, p-nitrobenzyl 7-[N-(1-carbomethoxy-2-propenyl)-D-2-thienylglycylamido]-3-methoxy-3-cephem-4-carboxylate is prepared and the 1-carbomethoxy-2-propenyl amino protecting group is removed by acid hydrolysis followed by the catalytic hydrogenolysis of the p-nitrobenzyl ester group to provide 7-(D-2-thienylglycylamido)-3-methoxy-3-cephem-4-carboxylic acid.

EXAMPLE 16

Following the procedures described in Examples 13 and 14, p-nitrobenzyl 7-[N-(1-carbomethoxy-2-propenyl)-D-4-hydroxyphenylglycylamido]-3-methoxy-3-cephem-4-carboxylate is prepared. The 1-carbomethoxy-2-propenyl amino protecting group and the p-nitrobenzyl ester group are removed to provide 7-(D-4-hydroxyphenylgylcylamido)-3-methoxy-3-cephem-4-carboxylic acid.

EXAMPLE 17 p-Nitrobenzyl 7-(D-phenylglycylamido)-3-hydroxy-3-cephem-4-carboxylate.

To a solution of 446 mg. of p-nitrobenzyl 7-amino-3-hydroxy-3-cephem-4-carboxylate in 20 ml. of acetonitrile containing 10 ml. of propylene oxide was added 206 mg. of D-phenylglycyl chloride hydrochloride. The reaction mixture was stirred for 16 hours at room temperature and was then evaporated in vacuo. The residue was triturated with acetonitrile to remove soluble impurities. The residue was then dried in vacuo to yield 315 mg. of p-nitrobenzyl 7-(D-phenylglycylamido)-3-hydroxy-3-cephem-4-carboxylate.

Elemental analysis for $C_{22}H_{20}N_4O_7S$: Theory: C, 54.54; H, 4.16; N, 11.57. Found: C, 54.99; H, 4.29; N, 11.02

I.R. (Nujol Mull): absorption peaks at 3.01 (amide), 5.75 (β-lactam carbonyl), and 6.10 (broad, amide, and hydrogen bonded ester carbonyl) microns.

I claim:
1. A compound of the formula

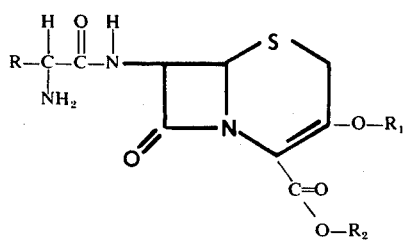

wherein
R is phenyl, hydroxyphenyl, halophenyl, methylphenyl, methoxyphenyl, 2-thienyl, 3-thienyl or 2-furyl;
$R_1$ is hydrogen, methyl, ethyl or 3-methyl-2-butenyl;
$R_2$ is hydrogen or a carboxylic acid protecting ester forming group;
and when $R_2$ is hydrogen the pharmaceutically acceptable nontoxic salts thereof; with the limitation that when $R_1$ is hydrogen, $R_2$ is a carboxylic acid protecting ester forming group.

2. The compound of claim 1 wherein $R_1$ is methyl.
3. The compound of claim 2, said compound being 7-(D-phenylglycylamido)-3-methoxy-3-cephem-4-carboxylic acid.
4. The compound of claim 2, said compound being p-nitrobenzyl 7-(D-phenylglycylamido)-3-methoxy-3-cephem-4-carboxylate.
5. The compound of claim 2 wherein R is hydroxyphenyl.
6. The compound of claim 1 wherein $R_1$ is hydrogen.
7. The compound of claim 6, said compound being p-nitrobenzyl 7-(D-phenylglycylamido)-3-hydroxy-3-cephem-4-carboxylate.
8. The compound of claim 1, wherein the amino group of the 7-glycylamido substituent is protected with an amino protecting group selected from the group consisting of t-butyloxycarbonyl, 2,2,2-trichloroethoxycarbonyl, benzyloxycarbonyl, p-methoxybenzyloxycarbonyl, and the 1-carbomethoxy-2-propenyl group of the formula

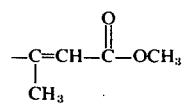

9. The compound of claim 8 said compound being p-nitrobenzyl 7-[N-(t-butyloxycarbonyl)-D-phenylglycylamido]-3-methoxy-3-cephem-4-carboxylate.
10. The compound of claim 8 said compound being p-nitrobenzyl 7-[N-(1-carbomethoxy-2-propenyl)-D-phenylglycylamido]-3-methoxy-3-cephem-4-carboxylate.

* * * * *

Notice of Adverse Decision in Interference

In Interference No. 99,581, involving Patent No. 3,917,588, R. R. Chauvette, ALPHA-AMINOACYL CEPHALOSPORIN ETHERS, final judgment adverse to the patentee was rendered September 30, 1981, as to claims 4, 5 and 9.
[*Official Gazette February 23, 1982.*]